No. 731,878. PATENTED JUNE 23, 1903.
A. FISCHER.
FILTER.
APPLICATION FILED MAR. 2, 1903.
NO MODEL.
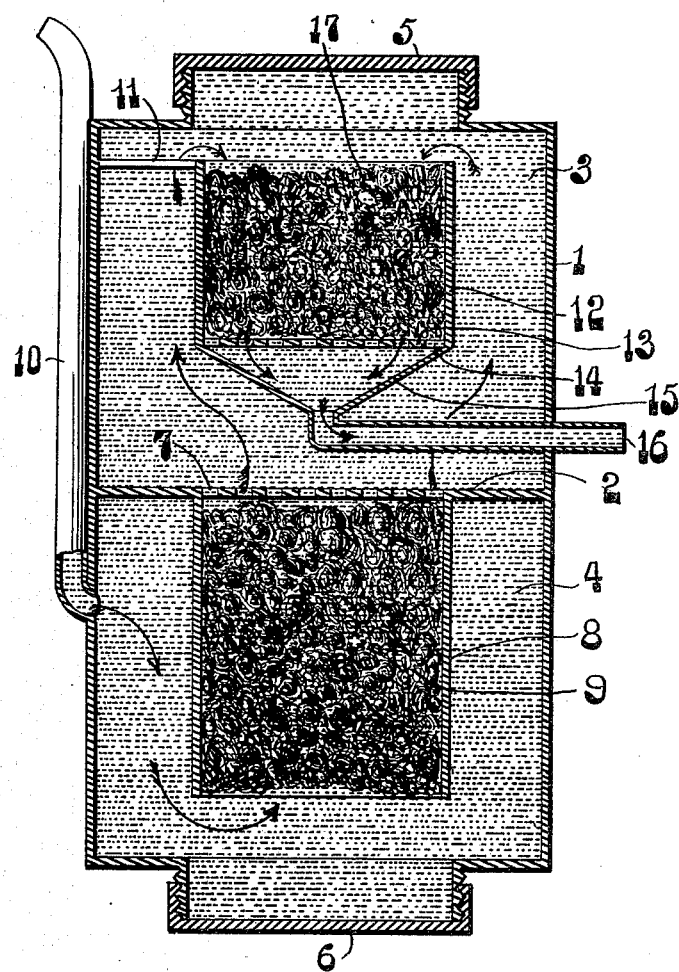
WITNESSES:
Geo. H. Harvey.
F. N. Barber.
INVENTOR,
Adolph Fischer
By Wm L. Pierce, his Att'y.

No. 731,878.

Patented June 23, 1903.

UNITED STATES PATENT OFFICE.

ADOLPH FISCHER, OF McKEESPORT, PENNSYLVANIA, ASSIGNOR OF ONE-HALF TO MAX SELKOVITS, OF BRADDOCK, PENNSYLVANIA.

FILTER.

SPECIFICATION forming part of Letters Patent No. 731,878, dated June 23, 1903.

Application filed March 2, 1903. Serial No. 145,673. (No model.)

*To all whom it may concern:*

Be it known that I, ADOLPH FISCHER, a citizen of the United States, residing at McKeesport, in the county of Allegheny and State of Pennsylvania, have invented and discovered new and useful Improvements in Filters, of which the following is a specification.

My invention relates to filters, its object being to provide a filtering device which is cheap, durable, easily cleaned, and not liable to get out of order.

The drawing shows in vertical section one form of my invention.

I provide an elongated cylindrical casing 1, preferably metallic, having near its central portion a transverse partition 2, which divides the casing 1 into two compartments or chambers 3 and 4. The ends of the casing 1 are closed by screw-caps 5 and 6, which are easily removed to permit access to the interiors of the compartments 3 and 4. The partition 2 has a portion thereof with perforations 7, which constitute a sieve or strainer, and the perforated portion is included within the circumference of the tube or sponge holder 8, which is secured at one end to the partition 2 and has its other end open and near the lower end of the casing. The tube 8 and perforations 7 are shown concentrically arranged about the axis of the casing 1; but they may be otherwise arranged, if desired. A sponge 9 or other filtering material is placed in the tube or holder 8. An inlet-pipe 10 leads into the upper part of the chamber 4.

Secured to the inner side of the upper end of the chamber 3 is a horizontal connecting-piece 11, on which is secured the upper end of the tube or sponge holder 12, having the bottom 13 provided with perforations 14. Below the bottom 13 and secured to the outer part thereof is a funnel-like extension 15, having an opening in its bottom connected to the outlet-pipe 16, which lies near the partition 2. A sponge 17 is put into the tube 12.

The operation of my filter is as follows: The water enters the chamber 4 through the inlet-pipe 10 and then passes up through the sponge or filtering material 9 in the tube or holder 8. From the holder 8 the water passes through the perforations 7 into the chamber 3 and then downward through the sponge 17 in the tube or holder 12 and extension 15 and finally passes out through outlet-pipe 16.

If desired, the sponges 9 and 17 may be supplied with such chemicals as the impurities in the water may require for their elimination.

The caps 5 and 6 may be removed from time to time, so that the chambers 3 and 4 may be cleaned and the sponges removed.

Of course my filter can be used for other fluids than water.

I do not desire to be restricted to the precise construction shown, but include all changes that fairly fall within the scope thereof.

Having described my invention, I claim—

1. A filter having a partition dividing the same into two compartments and having a portion thereof perforated, an open holder located in one compartment and secured to said partition so as to include therein the perforations in the partition, an open holder located in the other compartment, filtering material in said holders, an inlet-pipe leading into the first of said compartments, and an outlet-pipe connected to one end of the holder in the second compartment, the said partition and the bottom of said second holder permitting the flow of fluid from the filtering material therethrough.

2. A filter comprising a casing having a transverse partition extending from side to side thereof, dividing the filter into chambers, an open-bottomed holder located in one chamber and secured to the partition, an inlet-pipe for the said chamber, an open-topped holder in the other chamber, and an outlet-pipe connected to the bottom of said last holder, a removable cap at each end of said casing for permitting access to said holders and chambers, said partition allowing fluid to pass from the first holder into the second chamber.

Signed at Pittsburg this 27th day of February, 1903.

ADOLPH FISCHER.

Witnesses:
M. A. BUSHMAN,
A. M. STEEN.